(12) United States Patent
Keinänen et al.

(10) Patent No.: US 6,268,464 B1
(45) Date of Patent: Jul. 31, 2001

(54) UNSATURATED POLYESTER RESINS

(75) Inventors: Kari Keinänen, Porvoo (FI); Glenn Wigington, Forth Smith, AR (US)

(73) Assignee: Neste Chemicals Oy, Espoo (FI)

( * ) Notice: Subject to any disclaimer, the term of this patent is extended or adjusted under 35 U.S.C. 154(b) by 0 days.

(21) Appl. No.: 09/515,278

(22) Filed: Feb. 29, 2000

Related U.S. Application Data

(63) Continuation-in-part of application No. 09/174,421, filed on Oct. 19, 1998, now abandoned.

(51) Int. Cl.$^7$ ................................................ C08G 64/02
(52) U.S. Cl. ........................ 528/272; 528/176; 528/271
(58) Field of Search .................................. 528/176, 271, 528/272

(56) References Cited

U.S. PATENT DOCUMENTS

| | | | |
|---|---|---|---|
| 3,466,264 | 9/1969 | Hagemeyer et al. | 528/176 |
| 3,533,999 | 10/1970 | Fekete et al. | 528/176 |
| 4,038,340 | 7/1977 | Frank et al. | 528/176 |
| 4,294,748 | 10/1981 | Corrado et al. | 525/445 |
| 4,921,883 | 5/1990 | Meixner et al. | 522/107 |
| 5,510,453 | 4/1996 | Kressdorf et al. | 528/176 |
| 5,614,299 | 3/1997 | Yamamoto et al. | 523/500 |
| 5,688,867 | 11/1997 | Scheibelhoffer et al. | 528/176 |
| 5,874,503 | 2/1999 | Scheibelhoffer et al. | 528/176 |

FOREIGN PATENT DOCUMENTS

| | | |
|---|---|---|
| 0260 688 A2 | 3/1988 | (EP) . |
| 0284 888 A3 | 10/1988 | (EP) . |
| 0 400 884 A2 | 12/1990 | (EP) . |
| 0475 661 A3 | 3/1992 | (EP) . |
| 0722 995 A2 | 7/1996 | (EP) . |

OTHER PUBLICATIONS

Tentative Rules for Certification and Classification of Boats, Det Norske Veritas AS, Dec. 1997, Part 7, Chapter 1 "Approval of Raw Materials".

*Primary Examiner*—Terressa M Boykin
(74) *Attorney, Agent, or Firm*—Birch, Stewart, Kolasch & Birch, LLP

(57) ABSTRACT

The invention relates to unsaturated polyester resins with higher molecular weight, low viscosity and high solubility specially in reactive diluents. The invention also relates to a method for the manufacture of such unsaturated polyester resins and to use thereof in various applications such as gelcoats. The unsaturated polyester resin comprises 20–85 wt % of at least one unsaturated polyester having a molecular weight of 2000–6000, prepared from 1) 30–70 mol %, preferably 40–60 mol % of at least two carboxylic acids or derivatives thereof and at least one of them is an unsaturated carboxylic acid or a derivative thereof and at least one of them is an aromatic carboxylic acid or a derivative thereof and optionally of one or more carboxylic acids and derivatives thereof, 2) 30–70 mol %, preferably 40–60 mol % of at least two diols and at least one of them is 2,2,4-trimethyl-1,3-pentanediol and/or 2-butyl-2-ethyl- 1,3-propane-diol the amount of which is 0.5–8 mol %, preferably 2–6 mol %, 3) 0.5–10 mol %, preferably 2–6 mol % of at least one monoalcohol, 4) optionally a modifying chemical/chemicals and the total amount of monoalcohols and modifying chemicals is 0.5–20 mol %, preferably 1–15 mol %, and 15–50 wt % of at least one reactive diluent.

21 Claims, No Drawings

UNSATURATED POLYESTER RESINS

This application is a continuation-in-part of application Ser. No. 09/174,421 filed on Oct. 19, 1998 now abandoned, the entire contents of which are hereby incorporated by reference.

The invention relates to modified unsaturated polyester resins with a higher molecular weight, a low viscosity and high solubility especially in reactive diluents. The invention also relates to a method for the manufacture of such unsaturated polyester resins and to use thereof.

Unsaturated polyesters are polymers having structural units linked by ester groupings, and they can be manufactured by the condensation of carboxylic acids with polyhydric alcohols. Low molecular weight unsaturated polyesters are usually produced from maleic anhydride with diethylene glycol or, alternatively, other carboxylic acids or anhydrides such as fumaric acid, and glycols such as propylene glycol are used. Typically, the obtained unsaturated polyesters are in the form of a rather viscous oil. Low molecular weight unsaturated polyesters will crosslink in the presence of a peroxide by copolymerization with reactive diluents. Unsaturated polyester resins typically contain volatile unsaturated organic monomers such as styrene as the reactive diluent. In commercially available unsaturated polyester resin applications, up to 50% of styrene or other vinyl monomers are used. During curing, some of the organic monomer is usually lost in the atmosphere, 10–20% of the total amount of the monomer may be lost during resin spray-up and lamination and 30–50% during gelcoat spraying and thus these emissions cause occupational safety hazards and are also a problem because of environmental considerations. In most countries legislation introduced in recent years requires a reduction in the amount of volatile organic compounds (VOC) which may be released to the atmosphere. Several methods have been proposed for reducing VOC emissions, for example the replacement of the reactive diluent with a less volatile reactive diluent. This approach has led to slower curing times and/or incomplete curing at normal ambient temperatures. Another approach is a reduction in the amount of the reactive diluent in the composition. This approach has led to an increase in the viscosity of the resin beyond useable values. If the viscosity increase is compensated for by the use of a lower molecular weight polyester then poor final product properties will result. Still another approach has been the use of a suppressant which reduces the loss of VOCs. The suppressants are often waxes which may lead to a reduction in the interlaminar adhesion of laminating layers. On the other hand, requirements for the mechanical properties and for the quality of polyester resins and of their applications are constantly tightening, which can be seen especially in the field of marine applications. Thus, there is a clear need for polyester resins and their applications with low reactive diluent emissions and with superior properties and quality.

An unsaturated polyester resin is presented in DE 25 27 675 wherein the polyester resin comprises an α,β-ethylenically unsaturated polyester, the terminal groups of which comprise a high amount of residues of monoalcohols and a copolymerizable monomer. High amounts of monoalcohols yield rather expensive polymers with shorter molecular chains and poor mechanical properties. Additionally, the use of maleic anhydride as the sole source for a carboxylic acid derivative leads to resins with inferior chemical resistance and mechanical properties.

European patent publication EP 0 475 661 relates to unsaturated polyester resins which have improved hydrolytic stability and low molecular weights (Mw) of about 300 to 2500, and which are chain-stopped or endcapped with monofunctional alcohols or acids. The chain-stopped resins can be modified by addition of polyisocyanate and hydroxy acrylate to prepare resins for artificial marble, artificial onyx, fiber glass reinforced products, laminates, sheet moulding compounds and resin transfer moulding applications. Alternatively, the resins can also be modified by adding a polyisocyanate, a hydroxy acrylate and a dicyclopentadiene based unsaturated polyester resin to produce a composition suitable for low profile marine applications. These unsaturated polyesters are prepared by the condensation of dicarboxylic acids or anhydrides with polyhydric alcohols in the presence of chain-stopping monofunctional acids or alcohols.

U.S. Pat. No. 5 688 867 describes a polyester resin comprising (A) from about 5 wt % to about 50 wt % of a reactive diluent and (B) from about 50 wt % to about 95 wt % of an unsaturated polyester resin prepared from at least one polycarboxylic acid anhydride or ester, at least one polyhydric alcohol, and at least one component selected from a group consisting of (i) from about 0.5 mol % up to about 8 mol % of polyhydric alcohol having at least three hydroxyl groups, and at least one transesterification catalyst, (ii) from about 2 mol % up to about 12 mol % of a reaction product of a polyol and a fatty carboxylic acid, and (iii) from about 2 mol % up to about 12 mol % of a fatty reactant selected from the group consisting of a fatty primary alcohol, a fatty epoxide, a fatty monocarboxylic acid and mixtures thereof, wherein each member of the group has up to about 100 carbon atoms. The invention also relates to mixtures of polyester resins with conventional polyester resins. This invention provides resins and methods which have a low emission of volatile organic compounds.

An object of the present invention is to provide unsaturated polyester resins which have a higher molecular weight, a low viscosity and which are readily soluble in reactive diluents. Another object of the present invention is to provide unsaturated polyester resins for applications such as general purpose resins and gelcoats with reduced volatile organic compound emissions in order to reduce the risk of occupational safety hazards and environmental concerns. Additionally methods for the manufacture of such unsaturated polyester resins and unsaturated polyester systems including products and applications, with good physical properties such as good mechanical strength, weathering resistance and with good final product properties are desired, especially for marine applications with very strict requirements.

Characteristic features of the unsaturated polyester resins, of the manufacture thereof and of the use according to the invention are stated in the claims.

It has been found that the above-mentioned objects can be reached with the following solution. In accordance with the present invention unsaturated polyester resins are prepared by condensation of at least two carboxylic acids or derivatives thereof and at least one of them is an aromatic carboxylic acid or a derivative thereof, and at least one of them is an unsaturated carboxylic acid or a derivative thereof, with at least two diols and at least one of them is 2,2,4-trimethyl-1,3-pentanediol or 2-butyl-2-ethyl-1,3-propane diol, in the presence of at least one monoalcohol, and the obtained unsaturated polyester or mixtures of unsaturated polyesters are diluted in a reactive diluent or in mixtures of reactive diluents. Optionally one or more other carboxylic acids and one or more polyhydric alcohols may also be used as well as one or more modifying chemicals.

This specific combination of starting materials i.e. part of the carboxylic acids are unsaturated carboxylic acids and part are of aromatic nature, part of the diols are specified aliphatic branched diols, used with combination of a monoalcohol(s), yields the cured products the desired properties.

Suitably unsaturated carboxylic acids or derivatives thereof, such as maleic acid, maleic anhydride and fumaric acid and the like are used in an amount of at least 50 mol % of total amount of carboxylic acids. Preferably the aromatic carboxylic acid or a derivative thereof is phthalic acid, phthalic anhydride, terephthalic acid, isophthalic acid, tetrahydrophthalic anhydride, hexahydrophthalic acid or hexahydrophthalic anhydride. Suitable other carboxylic acids are adipic acid, trimellitic acid, trimellitic anhydride, dimethylmalonic acid, hydroxypivalic acid, 1,4-cyclohexanedicarboxylic acid. Unsaturated carboxylic acids, aromatic and other carboxylic acids or mixtures thereof are used in a total amount of 30–70 mol % and preferably 40–60 mol %.

2,2,4-trimethyl-1,3-pentanediol and 2-butyl-2-ethyl-1,3-propanediol are aliphatic branched diols, which are used in an amount of 0.5–8 mol %, preferably 2–6 mol %. Suitable other diols are such as ethylene glycol, propylene glycol, diethylene glycol, dipropylene glycol, neopentyl glycol, triethylene glycol, tripropylene glycol, cyclohexane dimethanol, hexane diol, butylene glycol, hydroxypivalyl hydroxy pivalate, 2-ethyl-1,3-hexanediol, 1,3-propanediol, 1,5-pentanediol, 2,2-diethyl-1,3-propanediol, propylene glycol, 1,2,3-propanetriol polymer with methyl oxirane, trimethylolpropane polymer with methyl oxirane, 2-methyl-1,3-propane-diol and 2-methyl-2,4-pentanediol. The diols or mixtures thereof are used in a total amount of 30–70 mol % and preferably 40–60 mol %. The amount of 40–60 mol % is especially suited for applications requiring extremely good weather tolerance in demanding conditions such as in gelcoats for marine applications.

Monoalcohols are used as endcappers and suitable ones are benzyl alcohol, phenylethanol, cyclohexanol, 2-ethylhexanol, 2-cyclohexyl ethanol, 2,2-dimethyl-1-propanol and layryl alcohol, which are used in an amount of 0.5–10 mol %, preferably 2–6 mol %.

The molar ratio of the said aliphatic branched diols to monoalcohols is 5:1–1:5 and preferably 2:1–1:2.

The optional modifying chemicals include monofunctional acids, such as benzoic acid, lauric acid, 2-ethylbuturic acid, 2-ethylhexanoic acid and phenylacetic acid, and glycidyl ester of neodecanoic acid, epoxystyrene and dicyclopentadiene. Mono-alcohols and optional modifying chemicals or mixtures thereof are used in a total amount of 0.5–20 mol % and preferably 4–15 mol %.

Optionally, polyhydric alcohols having at least three hydroxyl groups, such as trimethylol propane, trimethylol ethane, pentane erythritol, glycerine, and the like and mixtures thereof may be used in amounts of 0.5–20 mol % and preferably 1–10 mol %, the amount depending on the desired properties of the application. The excess of 4–25 mol % of total alcohols is suitable and preferably an excess of 5–20 mol % is used.

The reactive diluent is preferably an ethylenically unsaturated, monomeric compound, which compound includes allyl and vinyl compounds conventionally used for the preparation of unsaturated polyester based moldings, impregnating and coating compositions. Examples of reactive diluents include styrene, substituted styrenes, such as methoxystyrene, divinylbenzene, 4-ethylstyrene, 4-methylstyrene, 4-t-butylstyrene, p-chlorostyrene or vinyltoluene, esters of acrylic acid and methacrylic acid with alcohols or polyols, such as methyl methacrylate, butyl acrylate, ethyl-hexyl acrylate, hydroxypropyl methacrylate, lauryl acrylate, stearyl methacrylate, lauryl methacrylate, butanediol diacrylate, ethyleneglycol dimethacrylate, diethyleneglycol dimethacrylate, triethyleneglycol dimethacrylate, propyleneglycol dimethacrylate, dipropyleneglycol dimethacrylate, tripropyleneglycol dimethacrylate and trimethylolpropane triacrylate, allyl esters, such as diallyl phthalate, and vinyl esters, such as vinyl ethylhexanoate, vinyl pivalate, limonene, dipentene, vinyl ethers, indene, allyl benzene, and the like and mixtures thereof. Preferred reactive diluents are styrene, ai-methylstyrene, vinyltoluene, divinylbenzene, methyl methacrylate, hydroxypropyl methacrylate, ethyleneglycol dimethacrylate, diethyleneglycol dimethacrylate, triethyleneglycol dimethacrylate and mixtures of volatile diluents with less volatile diluents such as mixtures of styrene or derivatives thereof with said methacrylates. The amount of the reactive diluent or mixtures thereof varies between 15 and 50 wt %, preferably between 20 and 35 wt %. Preferable starting materials for the manufacture of resins especially suited for marine applications comprise phthalic anhydride, isophthalic acid, tetrahydrophthalic anhydride and hexahydrophthalic anhydride as aromatic carboxylic acids or derivatives thereof. Maleic anhydride is a suitable unsaturated carboxylic acid or a derivative thereof. 1,4-cyclohexanedicarboxylic acid and adipic acid are suitable as other carboxylic acids or derivatives thereof. 2,2,4-trimethyl-1,3-pentanediol and 2-butyl-2-ethyl-1,3-propanediol are suitable aliphatic branched diols. Propylene glycol, dipropylene glycol, diethylene glycol, neopentyl glycol, cyclohexane dimethanol, hexanediol, hydroxypivalyl hybroxypivalate, 1,5-pentanediol, 1,3-propanediol, 2-ethyl-1,3-hexanediol, 2,2-diethyl- 1,3-propanediol, 2-methyl-1,3-propanediol, 2-methyl-2,4-pentanediol, polypropylene glycol, 1,2,3-propanetriol polymer with methyl oxirane and trimethylolpropane polymer with methyl oxirane are suitable as other diols. As a monoalcohol benzyl alcohol, phenyl ethanol, cyclohexanol, 2-cyclohexylethanol, 2-ethylhexanol, 2,2-dimethyl-1-propanol are suitable. Glycidyl ester of neodecanoic acid, epoxystyrene, benzoic acid, phenylacetic acid are suitable as optional modifying chemicals.

Preferable starting materials for the manufacture of resins especially suited for general purpose resins and gelcoats comprise phthalic anhydride, isophthalic acid, tetrahydrophthalic anhydride and terephthalic acid as aromatic carboxylic acids or a derivative thereof. Maleic anhydride is a suitable unsaturated carboxylic acid or a derivative thereof. Trimellitic acid, dimethylmalonic acid and hydroxypivalic acid are suitable as other carboxylic acids or derivatives thereof. 2,2,4-trimethyl-1,3-pentanediol and 2-butyl-2-ethyl-1,3-propanediol are used as aliphatic branched diols. Propylene glycol, dipropylene glycol, ethylene glycol, diethylene glycol, triethylene glycol, tripropyleneglycol, neopentyl glycol, hexanediol, butylene glycol, hydroxy pivalyl hybroxypivalate, 1,5-pentanediol, hexanediol, 1,3-propanediol, 2-methyl-1,3-propanediol, 2-methyl-2,4-pentanediol, polypropylene glycol, 1,2,3-propanetriol polymer with methyloxirane and trimethylolpropane polymer with methyl oxirane are suitable as other diols. Benzyl alcohol, 2-ethyl-hexanol, 2,2-dimethyl-1-propanol and layryl alcohol are suitable as monoalcohols and benzoic acid, 2-ethylhexanoic acid, lauric acid, phenyl acetic acid and dicyclopentadiene may be used as optional modifying chemicals.

General purpose resins and gelcoats are suitable for applications such as fiber glass reinforced products, artificial marble, artificial onyx, sheet moulding compounds, resin transfer moulding applications, hand and spray lamination applications, sanitary applications, pigmented and clear gelcoats and topcoats/enamels.

The unsaturated polyester resin according to the invention comprises 20–85 wt %, preferably 30–80 wt % of at least one unsaturated polyester having a weight average molecular weight of 2000–6000, preferably 2600–6000, prepared from 1) 30–70 mol %, preferably 40–60 mol % of at least two carboxylic acids or derivatives thereof and at least one of them being an unsaturated carboxylic acid or a derivative thereof and at least one of them being an aromatic carboxylic acid or a derivative thereof, and optionally of another carboxylic acid or a derivative thereof;
2) 30–70 mol %, preferably 40–60 mol % of at least two diols and at least one of them is selected from 2,2,4-trimethyl-1,3-pentanediol and 2-butyl-2-ethyl-1,3-propanediol, and the amount of 2,2,4-trimethyl-1,3-pentane diol and/or 2-butyl-2-ethyl-1,3-propanediol is 0.5–8 mol %, preferably 2–6 mol %.
3) 0.5–10 mol %, preferably 2–6 mol % of at least one monoalcohol,
4) optionally a modifying chemical/chemicals and the total amount of monoalcohols and modifying chemicals is 0.5–20 mol %, preferably 1–15 mol %;

and 15–50 wt %, preferably 20–35 wt % of at least one reactive diluent.

Additionally an esterification catalyst for decreasing of reaction time may optionally be used in the manufacture of the linear unsaturated polyesters. The catalyst may be present in an amount known to a man skilled in the art. Suitable esterification catalyst include metal-containing catalysts, such as metal oxides, metal hydroxides and metal acetates. The progress of the polymerization reaction is conventionally monitored by means of acid number.

The molecular weight $M_w$ denotes weight average molecular weight and the molecular weight $M_n$ denotes number average molecular weight, both measured by Gel Permeation Chromatography (GPC) using a set of Waters Ultrastyragel (trade-mark) columns.

Suitable and preferred alternatives for the components in the resins according to the invention are listed above.

The unsaturated polyesters according to the invention can be prepared in a single-stage or in a two-stage process. A solvent process wherein an azeotropic solvent, such as xylene is used to facilitate water removal is also suitable. The unsaturated polyester resins according to the invention are preferably manufactured in the following manner. The alcohols and carboxylic acids or derivatives thereof are charged to a suitable reaction vessel and the reaction is carried out at a temperature of about 180–240° C., preferably 190–230° C. and it is continued until an acid number of 1–50, preferably 3–20 and an I.C.I. (cone and plate) viscosity of 1–10 poise/125° C., preferably 3–8 poise/125° C. of the linear unsaturated polyester are reached. Finally the linear unsaturated polyester or mixtures of linear unsaturated polyesters are dissolved in a suitable reactive diluent or a mixture thereof. In the case maleic anhydride and isophthalic acid or terephthalic acid are used, all acids except maleic anhydride are charged with alcohols. The reaction is then allowed to proceed until the reaction mixture is clear, and the acid number is below 70, more preferably below 30. After cooling the maleic anhydride is added. The encapper, monohydric alcohol can be added at the first or the second stage.

Components or additives generally known in the art may be employed in the process.

The unsaturated polyesters according to the invention exhibit acid numbers from 1 to 50, based on solids or nonvolatile content, and preferably the acid number is 3–20. The I.C.I viscosity of the linear unsaturated polyester is between 1–10 poise/125° C., preferably 3–8 poise/125° C., the weight average molecular weight Mw of the linear unsaturated polyester is 2000–6000, preferably 2600–6000 and the number average molecular weight Mn is 700–2500, preferably 1000–2200. Regardless of the longer chain length and higher molecular weight, the viscosity remains low and the solubility of the unsaturated polyester in reactive diluents such as styrene is good, which significantly reduces the need for reactive diluents, down to 20–35 wt %. Because of their solubility and viscosity properties, the unsaturated polyesters can be dissolved in smaller amounts of reactive diluents, and thus the emission of VOCs from the products manufactured from the resins according to the invention are significantly lower. The low styrene content in the resin results also in a more efficient material transfer and less loss of the product in applications because the product is less atomized. Mostly due to the higher molecular weight of the unsaturated polyester, the cured unsaturated polyester resins retain the mechanical properties such as weathering resistance, chemical resistance and UV-resistance and thus they are well suited especially for demanding applications. The unsaturated polyesters according to the invention are compatible and readily soluble in reactive diluents, such as styrene and the respective resins have good curing properties. Polyester derived products with superior surface quality, thermocycling and UV resistance and clarity are conveniently manufactured from the unsaturated polyester resins according to the invention.

The unsaturated polyester resins according to the invention are useful for a variety of applications such as general purpose resins, coating materials and reinforcing materials. They have utility as resins with reduced reactive diluent emissions for panels, laminates, fiber glass reinforced products, artificial marble, artificial onyx, sheet moulding compounds, resin transfer moulding applications, sanitary applications and as base resins, they are also well suited for demanding marine applications, and products such as pigmented or clear gelcoats and topcoats/enamels can be manufactured which meet the requirements described above.

The resins for marine applications have very tight requirements and Det Norske Veritas (DNV) approval and Lloyd's approval are required in several countries for polyester resins used for marine purposes. DNV requirements for mechanical properties of resins used in gelcoats for marine applications (Tentative Rules for Certification and Classification of Boats, Part 7 Chapter 1, Approval of Raw Materials, December 1997) are presented in the following:

Tensile strength $\geq 50$ MPa.

Tensile modulus $\geq 3000$ MPa.

Bending temperature (HDT) $\geq 70°$ C.

Water absorption $\leq 80$ mg/piece/28 d.

Barcol hardness $\geq 35$.

The unsaturated polyester resins according to the invention may be formulated together with suitable additives known in the art to form gelcoats, resins and polyester based products.

Gelcoats are curable compositions which contain at least one of the above unsaturated polyester resins with additives. Suitable additives include thixotropic agents, thixotropy enhancers, suppressants, surface tension agents, co-promoters, promoters, air release agents, fillers, wetting agents, levelling agents and pigments.

The thixotropic agents comprise silica compounds such as fumed silica and precipitated silica and inorganic clays like bentonite and hectorite clay. Thixotropy enhancers comprise propylene glycol and ethylene glycol and derivatives thereof. Promoters are usually added to unsaturated polyester resins to accelerate the decomposition of a peroxide initiator into free radicals and to thereby initiate or speed up the curing of the composition. The promoters are generally metal compounds, such as cobalt, manganese, iron, vanadium, copper, and aluminum salts of organic acids, such as octoate or naphthenate salts. Co-promoters are widely used in promoter systems and suitable ones are organic amines like dimethylaniline, diethylaniline, 2-aminopyridine, N,N-dimethyl-acetoacetamide, acetoacetanilide or other organic compounds like ethyl acetoacetate, methyl acetoacetate and N,N-dimethyl-p-toluidine. Inhibitors are used for adjusting storage stability and gel time, and suitable inhibitors comprise hydroquinone, toluhydroquinone, mono-tert-butylhydroquinone, hydroquinone monomethyl ether p-benzoquinone, 2,5-di-tert-butylhydroquinone. Gelcoats may also contain fillers such as talc, calcium carbonate, magnesium carbonate, barium carbonate, aluminium trihydroxide, calcium sulfate, magnesium sulfate, barium sulfate, chopped glassfiber and the like. Various pigments are typically used in gelcoats and titanium dioxide is a suitable one. Air release agents, wetting additives, surfactants or levelling additives based on silicone and fluorocarbon, and various modified polymers like acrylate and urethane may be added to gelcoats. Suppressants for reducing organic emissions may be included in gelcoats and such as polyethers, alcanoic acid esters of propoxylated phenols, propoxylated bisphenols or hydoxypropylphthalates, polyetherpolysiloxane blockcopolymers, waxes and the like are suitable. Various peroxides for curing/crosslinking are used and peroxides like methyl ethyl ketone peroxide, cumene hydroperoxide, t-butyl peroctoate, di-t-butyl peroxide, benzoyl peroxide and the like are suitable.

The unsaturated polyester resins according to the invention are readily dilutable in lower reactive monomer contents and the obtained products show low viscosity and excellent applicability. The mechanical properties of the cured products comply even with the strict requirements for marine gelcoats and products.

The unsaturated polyester resins and applications based thereon are well suited for hand lay up lamination, spray lamination, resin lamination, pultrusion, sheet moulding compounding, bulk moulding compounding and applications well known to the man skilled in the art. The obtained products achieve to reduced volatile organic compound emissions, they have acceptable geltime, good adhesion, weathering resinstance, low water absorption and good final product properties. The UV-resistance, low shrinkage properties and hydrolytic stability of the products are good due to the lower reactive diluent content and due to other properties of the resins.

Following examples provide a better understanding of the present invention, how ever they are not be intended as limiting the scope thereof.

EXAMPLE 1

General Purpose Resins 1A, 1B, 1C and 1D

| | Resin | | | |
|---|---|---|---|---|
| | 1A | 1B | 1C | 1D |
| Starting material (mol %) | | | | |
| Propylene glycol | 12 | 12 | 12 | 10 |
| Neopentyl glycol | 33 | 33 | 33 | 33 |
| 2-Butyl-2-ethyl-1,3-propanediol | 4 | 5 | 4 | 5 |
| 1,4-Cyclohexanedicarboxylic acid | | | 4 | |
| Isophthalic acid | 15 | 14 | 14 | 14 |
| Adipic acid | 3 | 3 | | 3 |
| Maleic anhydride | 28 | 28 | 28 | 27 |
| 2-Ethylhexanoic acid | | 2 | | 4 |
| 2-Phenylethyl alcohol | | | | 4 |
| Benzyl alcohol | | 3 | 5 | |
| 2-Ethylhexanol | 5 | | | |
| Property of linear unsaturated polyester | | | | |
| Cook end points: I.C.I./150° C.* (poise) | 1.3 | 1.7 | 1.4 | 0.8 |
| Acid number | 12 | 15 | 19 | 20 |
| Property of linear unsaturated polyester in styrene | | | | |
| I.C.I./25° C. (poise) | | 3.8 | 3 | 3.5 |
| Styrene % | | 30 | 35 | 35 |
| Mw | 3200 | 3000 | 2800 | 3100 |
| Mn | 1700 | 1100 | 1600 | 1600 |
| Mechanical properties of cured resin in styrene | | | | |
| Tensile strength (MPa) | | 40 | 65 | 40 |
| Tensile elongation (%) | | 3 | 7 | 6 |
| Tensile modulus (MPa) | | 2600 | 3200 | 1950 |
| HDT (° C.) | | 59 | 57 | 50 |
| Barcol | | 33 | 36 | 22 |

*I.C.I viscosity was measured at 150° C. yielding lower values when compared with 125° C.

EXAMPLE 2

General Purpose Resins 2A, 2B, 2C and 2D

| | Resin | | | |
|---|---|---|---|---|
| | 2A | 2B | 2C | 2D |
| Starting material (mol %) | | | | |
| Neopentylglycol | 34 | 32 | 33 | 26 |
| Propylene glycol | 9 | 12 | 7 | 11 |
| Dipropylene glycol | | | 4 | 3 |
| 2-Butyl-2-ethyl-1,3-propanediol | | 5 | 5 | |
| 2,2,4-Trimethyl-1,2-pentanediol | 6 | | | 10 |
| Isophthalic acid | 12 | 11 | 13 | 14 |
| Adipic acid | 5 | 3 | | |
| Maleic anhydride | 29 | 31 | 32 | 31 |
| Benzyl alcohol | 5 | 6 | 6 | 5 |
| Property of linear polyester | | | | |
| Cook end points: I.C.I./150° C. (poise) | 4.3 | 2.8 | 3.4 | 4 |
| Acid number | 18 | 9 | 10 | 16 |
| Property of linear polyester in styrene | | | | |
| I.C.I./25° C. (poise) 35% styrene | 2.6 | 2.4 | 2.7 | 3 |
| Mw | 2800 | 2600 | 2840 | 2500 |
| Mn | 1300 | 1200 | 1500 | 1400 |

-continued

| | Resin | | | |
|---|---|---|---|---|
| | 2A | 2B | 2C | 2D |
| Mechanical properties of cured resin in 40% styrene | | | | |
| Tensile strength (MPa) | 60 | 37 | 48 | 60 |
| Tensile elong (%) | 5 | 5 | 4 | 5 |
| Tensile modulus (MPa) | 2600 | 2500 | 2500 | 3000 |
| HDT (° C.) | 71 | 70 | 56 | 71 |
| Barcol | 34 | 33 | 36 | 36 |

EXAMPLE 3

Gelcoats 3A, 3B, 3C and 3D Made From Resins 2A, 2B, 2C and 2D for General Purpose Applications

| | Gelcoat | | | |
|---|---|---|---|---|
| Constituent (wt %) | 3A | 3B | 3C | 3D |
| Resin (30% styrene) | 2A 64 | 2B 64 | 2C 64 | 2D 64 |
| Air Release agent | 0.2 | 0.2 | 0.2 | 0.2 |
| Talc | 7 | 7 | 7 | 7 |
| Titanium dioxide | 17 | 17 | 17 | 17 |
| Thixotropic agent | 1.3 | 1.3 | 1.3 | 1.3 |
| Styrene | 7.5 | 7.5 | 9.5 | 11 |
| Cobalt (10%) | 0.12 | 0.12 | 0.12 | 0.12 |
| Inhibitor | 0.13 | 0.13 | 0.13 | 0.13 |
| Property | | | | |
| Styrene % | 28 | 28 | 29 | 30 |
| Styrene emission ** (ppm) | 145 | 150 | 185 | 145 |
| Brookfield viscosity/10 RPM | 11940 | 11400 | 7420 | 8920 |
| Thixotropic index 5/50 RPM | 5.1 | 5.2 | 4.4 | 4.68 |
| Accelerated weathering test | | | | |
| Gloss 60 ° | 90 | 89 | 91 | 92 |
| QUV-A 250 h CIE L*a*b* (Db*) | 1.1 | 1 | 1.2 | 1.3 |
| Gloss 60 ° | 83 | 84 | 85 | 85 |
| QUV-A 500 h CIE L*a*b* (Db*) | 1.4 | 1.3 | 1.7 | 2 |
| Gloss 60 ° | 81 | 81 | 84 | 83 |

** maximum styrene concentration in exhaust air during spraying

EXAMPLE 4

Resins 4A, 4B, 4C, and 4D and 4E for Marine Applications

| | Resin | | | |
|---|---|---|---|---|
| | 4A | 4B | 4C | 4E |
| Starting material (mol %) | | | | |
| Neopentyl glycol | 23 | 30 | 30 | 30 |
| Propylene glycol | 11 | 10 | 11 | 12 |
| 2-Butyl-2-ethyl-1,3-propanediol | 6 | 3 | 3 | 3 |
| Hydroxypivalyl hydroxypivalate | 9 | 5 | 5 | 5 |
| Isophthalic acid | 16 | 14 | 14 | 13 |
| Adipic acid | | 2 | 2 | 2 |
| Maleic anhydride | 29 | 30 | 29 | 29 |
| 1-Phenyl ethyl alcohol | | 3 | 3 | 3 |
| Benzyl alcohol | 6 | 3 | 3 | 3 |

-continued

| | Resin | | | |
|---|---|---|---|---|
| | 4A | 4B | 4C | 4E |
| Property of linear polyester | | | | |
| Cook end points: I.C.I./150° C. (poise) | 3.2 | 2.5 | 2.5 | 1.5 |
| Acid number | 42 | 21 | 18 | 17 |
| Property of linear polyester in styrene | | | | |
| I.C.I./25° C. (poise) 35% styrene | 7 | 4.7 | 4.6 | 3.3 |
| Mw | 3100 | 3600 | 3500 | 3000 |
| Mn | 1700 | 1900 | 1400 | 1500 |
| Mechanical properties of cured resin in 40% styrene | | | | |
| Tensile strength (MPa) | 67 | 87 | 73 | 65 |
| Tensile elongation (%) | 3 | 5 | 3 | 4 |
| Tensile modulus (MPa) | 3500 | 4300 | 3800 | 3400 |
| HDT (° C.) | 73 | 75 | 73 | 64 |
| Barcol | 39 | 38 | 37 | 38 |
| Water abs (28d)/(mg) / piece | 78 | 73 | 73 | 73 |

EXAMPLE 5

Gelcoats 5A, 5B, 5C, 5D and 5E Made from Resin 4A, 4B, 4C, 4D and 4E for Marine Applications and Commercial Isophthalic Based Marine Gelcoat GN 10000S (Neste Oy) for Reference Purposes

| | Gelcoats | | | | Reference gelcoat GN |
|---|---|---|---|---|---|
| Constituent (w %) | 5A | 5B | 5C | 5D | 10000S |
| Resin (styrene 30%) | 4A 63 | 4B 63 | 4C 67 | 4D 64 | |
| Air release agent | 0.2 | 0.2 | 0.2 | 0.2 | |
| Talc | 7 | 7 | 7 | 7 | |
| Titanium dioxide | 15 | 15 | 15 | 15 | |
| Thixotropic agent | 1.3 | 1.3 | 1.3 | 1.3 | |
| Styrene | 13.5 | 14 | 9 | 12 | |
| Cobalt (10%) | 0.12 | 0.12 | 0.12 | 0.12 | |
| Inhibitor | 0.13 | 0.13 | 0.13 | 0.13 | |
| Property | | | | | |
| Styrene % | 33 | 33 | 30 | 28 | 36 |
| Styrene emission ** (ppm) | 175 | 210 | 200 | 190 | 260 |
| Brookfield viscosity/10 RPM | 8500 | 4160 | 10560 | 6680 | 7500 |
| Thixotropic index 5/50 RPM | 4.5 | 4.3 | 4.8 | 4.2 | 4.8 |
| Accelerated weathering test | | | | | |
| Gloss 60 ° | 95 | 88 | 90 | 87 | 84 |
| QUV-A 250 h CIE L*a*b* (Db*) | 2 | 1.8 | 0.9 | 1.3 | 1.9 |
| Gloss 60 ° | 85 | 84 | 84 | 84 | 81 |
| QUV-A 500 h CIE L*a*b* (Db*) | 1.7 | 1.2 | 1.9 | 2.4 | 2.9 |
| Gloss 60 ° | 84 | 86 | 83 | 85 | 81 |

** maximum styrene concentration in exhaust air during spraying

What is claimed is:

1. An unsaturated polyester resin, wherein said resin comprises 20–85 wt % of at least one unsaturated polyester having a weight average molecular weight Mw of 2000–6000, prepared from 1) 30–70 mol % of at least two carboxylic acids or derivatives thereof and at least one of them is an unsaturated carboxylic acid or a derivative thereof in an amount of 50 mol % from total amount of carboxylic acids, and at least one of them is an aromatic carboxylic acid or a derivative thereof and optionally of one or more other carboxylic acids or derivatives thereof;
2) 30–70 mol % of at least two diols and at least one of them is selected from 2,2,4-trimethyl-1,3-pentanediol and 2-butyl-2-ethyl-1,3-propanediol and the amount of 2,2,4-trimethyl-1,3-pentanediol and/or 2-butyl-2-ethyl-1,3-propanediol is 0.5–8 mol %;
3) 0.5–10 mol % of at least one monoalcohol;
4) optionally a modifying chemical/chemicals and the total amount of monoalcohols and modifying chemicals is 0.5–20 mol %;

and 15–50 wt % of at least one reactive diluent.

2. The unsaturated polyester resin according to claim 1, wherein said resin comprises 30–80 wt % of at least one unsaturated polyester having a weight average molecular weight of 2600–6000 as measured by Gel Permeation Chromatography (GPC), prepared from 1) 40–60 mol % of at least two carboxylic acids or derivatives thereof;
2) 40–60 mol % of at least two diols and the amount of 2,2,4-trimethyl-1,3-pentanediol and/or 2-butyl-2-ethyl-1,3-propanediol is 2–6 mol %;
3) 2–6 mol % of at least one monoalcohol;
4) optionally a modifying chemical/chemicals and the total amount of monoalcohols and modifying chemicals is 1–15 mol %;

and 20–35 wt % of at least one reactive diluent.

3. The unsaturated polyester resin according to claim 1 or 2, wherein said unsaturated carboxylic acid or a derivative thereof is maleic acid, maleic anhydride or fumaric acid.

4. The unsaturated polyester resin according to claim 3, wherein said other diols are selected from ethylene glycol, propylene glycol, diethylene glycol, dipropylene glycol, neopentyl glycol, triethylene glycol, tripropylene glycol, cyclohexane dimethanol, hexane diol, butylene glycol, hydroxypivalyl hydroxy pivalate, 2-ethyl-1,3-hexanediol, 1,3-propanedioll, 1,5-pentanediol, 2,2-diethyl-1,3-propanediol, propylene glycol, 1,2,3-propantriol polymer with methyl oxirane, trimethylolropane polymer with methyl oxirane, 2-methyl-1,3-propanediol and 2-methyl-2,4-pentanediol.

5. The unsaturated polyester resin according to claim 4, wherein said monoalcohols are selected from benzyl alcohol, phenylethanol, cyclohexanol, 2-ethylhexanol, 2-cyclohexyl ethanol, 2,2-dimethyl-l-propanol and layryl alcohol.

6. The unsaturated polyester resin according to claim 3, wherein modifying chemicals are selected from benzoic acid, lauric acid, 2-ethylbuturic acid, 2-ethylhexanoic acid and phenylacetic acid, and glycidyl ester of neodecanoic acid, epoxy styrene and dicyclopentadiene.

7. The unsaturated polyester resin according to claim 3, wherein said I.C.I. viscosity of the unsaturated polyester is 1–10 poise/125° C., the acid number is 1–50 and Mn is 700–2500 as measured by Gel Permeation Chromatography (GPC).

8. The unsaturated polyester resin according to claim 3, wherein said I.C.I. viscosity of the unsaturated polyester is 1–10 poise/125° C., the acid number is 3–20 and Mn is 1000–2200 as measured by Gel Permeation Chromatography (GPC).

9. A process for the manufacture of an unsaturated polyester resin, wherein 30–70 mol % of at least two carboxylic acids or derivatives thereof and at least one of them is an unsaturated carboxylic acid or a derivative thereof in an amount of 50 mol % from total amount of carboxylic acids, and at least one of them is an aromatic carboxylic acid or a derivative thereof and optionally of one or more carboxylic acids or derivatives thereof, and 30–70 mol % of at least two diols and at least one of them is selected from 2,2,4-trimethyl-1,3-pentanediol and 2-butyl-2-ethyl-1,3-propanediol and the amount of 2,2,4-trimethyl-1,3-pentanediol and/or 2-butyl-2-ethyl-1,3 is 0.5–8 mol %, and 0.5–10 mol % of at least one monoalcohol, and optionally a modifying chemical/chemicals and the total amount of monoalcohol/alcohols and modifying chemical/chemicals is 0.5–20 mol %, are charged to a suitable reaction vessel and the reaction is carried out at a temperature of 180–240° C. and is continued until the acid number of 1–50 and I.C.I. viscosity of the linear polyester of 1–10 poise/125° C. are reached, if maleic anhydride is used with isophthalic or terephthalic acid, the reaction is allowed to proceed without maleic anhydride until the reaction mixture is clear and until acid number below 70 is reached, then, after cooling of the reaction mixture, maleic anhydride is added, and finally the linear unsaturated polyester or mixtures thereof are dissolved in an amount of 15–50 wt % of at least one reactive diluent.

10. A process for the manufacture of an unsaturated polyester resin according to claim 9, wherein 40–60 mol % of at least two carboxylic acids or derivatives thereof, and 40–60 mol % of at least two diols and the amount of 2,2,4-trimethyl-1,3-pentanediol and/or 2-butyl-2-ethyl-1,3-propanediol is 2–6 mol %, and 2–6 mol % of at least one monoalcohol, and the total amount of monoalcohol/alcohols and modifying chemical/chemicals is 1–15 mol %, are charged to a suitable reaction vessel and the reaction is carried out at a temperature of 190–230° C. and it is continued until the acid number of 3–40 and I.C.I. viscosity of the linear polyester of 3–8 poise/125° C. are reached, if maleic anhydride is used with isophthalic or terephthalic acid the reaction is allowed to proceed without maleic anhydride until the reaction mixture is clear and until acid number below 30 is reached, then after cooling of the reaction mixture maleic anhydride is added, and finally the linear polyester or mixtures thereof are dissolved in an amount of 20–35 wt % of at least one reactive diluent.

11. A product obtained by the process according to claims 9 or 10, wherein the weight average molecular weight Mw of the product is 2000–6000 and number average molecular weight Mn of the product is 700–2500.

12. The unsaturated polyester resin according to claim 1 or prepared according to the process of claim 9, wherein said resin comprises general purpose resins, resins for marine applications, resins for fiber glass reinforced products, artificial marble, artificial onyx, sheet moulding compounds, resin transfer moulding applications, resins for hand and spray lamination applications, resins for sanitary applications, pigmented and clear gelcoats and topcoats/enamels.

13. A gelcoat, comprising 20–85 wt % of at least one unsaturated polyester with a weight average molecular weight Mw of 2600–6000 and 15–50 wt % of at least one reactive diluent, and additives selected from the group consisting of catalysts, inhibitors, thixotropic agents, thixotropy enhancers, promoters, co-promoters, fillers, pigments, air release agents, wetting agents, lewelling agents, surfactants and suppressants, and that the unsaturated polyester is prepared from 1) 30–70 wt % of at least two carboxylic acids or derivatives thereof and at least one of them is an unsaturated carboxylic acid or a derivative thereof and at least one of them is an aromatic carboxylic acid or a derivative thereof and optionally of one or more carboxylic acids or derivatives thereof;
2) 30–70 wt % of at least two diols and at least one of them is selected from 2,2,4-trimethyl-1,3,pentanediol and 2-butyl-2ethyl-1,3-propanediol and the amount of 2,2,4-trimethyl-1,3-pentanediol and/or 2-butyl-2-ethyl-1,3-propandiol is 0.5–8 mol %.
3) 0.5–10 mol % of at least one monoalcohol;
4) optionally a modifying chemical/chemicals and the total amount of monoalcohols and modifying chemicals is 0.5–20 mol %
and 15–50 wt % of at least one reactive diluent.

14. The gelcoat according to claim 13 for marine applications, characterized in that the polyester is prepared from
1) unsaturated and other carboxylic acids or derivatives thereof, selected from the group consisting of phthalic anhydride, isophthalic acid, tetrahydrophthalic anhydride, hexahydrophthalic anhydride, adipic acid, maleic anhydride and 1,4-cyclohexanedicarboxylic acid;
2) other diol/diols selected from the group consisting of propylene glycol, di-propylene glycol, diethylene glycol, neopentyl glycol, cyclohexane dimethanol, hexanediol, hydroxyprivalyl hy droxypivalate, 1,5-pentanediol, 1,3-propanediol, 2-ethyl-1,3-hexanediol, 2,2-diethyl-1,3-propanediol, 2-methyl-1,3-propanediol, 2-methyl-2,4-pentanediol, polypropylene glycol, 1,2,3-propanetriol polymer with methyl oxirane and trimethylolpropane polymer with methyl oxirane;
3) a monoalcohol/monoalcohols selected from the group consisting of benzyl alcohol, benzoic acid, phenyl ethanol, cyclohexanol, 2-ethyl hexanol and optionally a modifying chemical/chemicals selected from the group consisting of glycidyl ester of neodecanoic acid, 2-cyclhexyletanol, 2,2-dimethyl-1-propanol, epoxy styrene and phenylacetic acid.

15. The gelcoat according to claim 13 or 14, wherein said mechanical properties of the cured unsaturated polyester resin are:
Tensile strength ≧50 Mpa,
Tensile modulus ≧3000 Mpa,
Bending temperature (HDT)≧70° C.,
Water absorption ≦80 mg/piece/28, and
Barcol hardness ≧35.

16. The gelcoat according to claim 13 for general purposes, wherein said polyester is prepared from:
1) unsaturated and other carboxylic acids or derivatives thereof selected from the group consisting of phthalic anhydride, isophthalic acid, tetrahydrophthalic anhydride, terephtalic acid, adipic acid, maleic anhydride, trimellitic acid, dimethylmalonic acid and hydroxypivalic acid;
2) other diol/diols selected from the group consisting of propylene glycol, di-propylene glycol, ethylene glycol, diethylene glycol, triethylene glycol, tripropyleneglycol, neopentyl glycol, hexanediol, butylene glycol, hydro xypivalyl hydroxypivalate, 1,5-pentanediol, hexanediol, 1,3-propanediol, 2-methyl-1, 3-propanediol, 2-methyl-2,4-pentanediol, polyproylene glycol, 1,2,3-propanetriol polymer with methyloxirane and trimethylolpropane polymer with methyl oxirane;

3) a monoalcohol/monoalcohols selected from the group consisting of benzyl alcohol, 2-ethylhexanol, 2,2-dimethyl-l-propanol, layryl alcohol, phenyl acetic acid and dicyclopentadiene and optionally a modifying chemical/chemicals selected from the group consisting of benzoic acid, 2-ethylhexanoic acid and lauric acid.

17. The product according to claim 11, wherein the weight average molecular weight Mw is 2600–6000 and the number average molecular weight Mn is 1000–2200.

18. The gelcoat of claim 13, wherein said unsaturated polyester with a weight average molecular weight Mw of 2600–6000 comprises 30–80 wt %, said reactive diluent comprises 20–35 wt %, and additives selected from the group consisting of catalysts, inhibitors, thixotropic agents, thixotropy enhancers, promoters, co-promoters, fillers, pigments, air release agents, wetting agents, lewelling agents, surfactants and suppressants, and that the unsaturated polyester is prepared from
1) 40–60 mol %, of said carboxylic acids or derivatives thereof and at least one of them is an unsaturated carboxylic acid or a derivative thereof and at least one of them is an aromatic carboxylic acid or a derivative thereof and optionally of one or more carboxylic acids or derivatives thereof;
2) 40–60 mol % of said diols and at least one of them is selected from 2,2,4-trimethyl-1,3,pentanediol and 2-butyl-2ethyl-1,3-propanediol and the amount of said 2,2,4-trimethyl-1,3-pentanediol and/or 2-butyl-2-ethyl-1,3-propandiol is 2–6 mol %
3) 2–6 mol % of at least one monoalcohol;
4) optionally a modifying chemical/chemicals and the total amount of monoalcohols and modifying chemicals is 1–15 mol %;
and 20–35 wt % of at least one reactive diluent.

19. An unsaturated polyester resin wherein said resin comprises 20–85 wt % of at least one unsaturated polyester having a weight average molecular weight Mw of 2000–6000 as measured by Gel Permeation Chromatography (GPC), prepared from
1) 30–70 mol % of at least two carboxylic acids or derivatives thereof and at least one of them is an unsaturated carboxylic acid or a derivative thereof in an amount of 50 mol % from total amount of carboxylic acids, and at least one of them is an aromatic carbosylic acid or a derivative thereof and optionally of one or more other carboxylic acids or derivatives thereof;
2) 30–70 mol % of at least two diols and at least one of them is selected from 2,2,4-trimethyl-1,3-pentanediol and 2-butyl-2-ethyl-1,3-propanediol and the amount of 2,2,4-trimethyl-1,3-pentanediol and/or 2-butyl-2-ethyl-1,3-propanediol is 0.5–8 mol %;
3) 0.5–10 mol % of at least one monoalcohol;
4) optionally a modifying chemical/chemicals and the total amount of monoalcohols and modifying chemicals is 0.5–20 mol %;
and 15–50 wt % of at least one reactive diluent.

20. A product obtained by the process according to claims 9 or 10, wherein the weight average molecular weight Mw of the product is 2000–6000 as measured by Gel Permeation Chromatography (GPC)_ and number average molecular weight Mn of the product is 700–2500 as measured by Gel Permeation Chromatography (GPC).

21. A _ elcoat, comprising 20–85 wt % of at least one unsaturated polyester with a weight average molecular weight Mw of 2600–6000 as measured by Gel Permeation Chromatography (GPC) and 15–50 wt % of at least one reactive diluent, and additives selected from the group consisting of catalysts, inhibitors, thixotropic agents, thixotropy enhancers, promoters, co-promoters, fillers, pigments, air release agents, wetting agents, lewelling agents, surfactants and suppressants, and that the unsaturated polyester is prepared from 5) 30–70 wt % of at least two carboxylic acids or derivatives thereof and at least one of them is an unsaturated carboxylic acid or a derivative thereof and at least one of them is an aromatic carboxylic acid or a derivative thereof and optionally of one or more carboxylic acids or derivatives thereof;

6) 30–70 wt % of at least two diols and at least one of them is selected from 2,2,4-trimethyl-1,3,pentanediol and 2-butyl-2ethyl-1,3-propanediol and the amount of 2,2,4-trimethyl-1,3-pentanediol and/or 2-butyl-2-ethyl-1,3-propandiol is 0.5–8 mol %

7) 0.5–10 mol % of at least one monoalcohol;

8) optionally a modifying chemical/chemicals and the total amount of monoalcohols and modifying chemicals is 0.5–20 mol % and 15–50 wt % of at least one reactive diluent.

* * * * *